US009321893B2

(12) United States Patent
Sommer et al.

(10) Patent No.: US 9,321,893 B2
(45) Date of Patent: Apr. 26, 2016

(54) RADIATION-CURABLE WHIPPED FOAMS

(75) Inventors: Stefan Sommer, Leverkusen (DE); Jan Weikard, Leverkusen (DE); Holger Casselmann, Odenthal (DE); Thomas Michaelis, Leverkusen (DE); Erhard Lühmann, Bomlitz (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 13/583,251

(22) PCT Filed: Mar. 4, 2011

(86) PCT No.: PCT/EP2011/053288
§ 371 (c)(1),
(2), (4) Date: Sep. 7, 2012

(87) PCT Pub. No.: WO2011/110487
PCT Pub. Date: Sep. 15, 2011

(65) Prior Publication Data
US 2012/0329895 A1      Dec. 27, 2012

(30) Foreign Application Priority Data
Mar. 9, 2010   (DE) .................. 10 2010 010 621

(51) Int. Cl.
C08J 9/30 (2006.01)
C08J 7/12 (2006.01)
C08G 18/04 (2006.01)
C08G 18/62 (2006.01)
C08G 101/00 (2006.01)

(52) U.S. Cl.
CPC . *C08J 9/30* (2013.01); *C08G 18/04* (2013.01); *C08G 18/62* (2013.01); *C08G 18/6225* (2013.01); *C08J 7/123* (2013.01); *C08G 2101/0041* (2013.01); *C08J 2201/026* (2013.01); *C08J 2375/16* (2013.01)

(58) Field of Classification Search
CPC ...... C08G 2/02; C08G 18/6225; C08G 18/04; C08G 18/62; C08G 2101/0041; C08G 2101/066; C08J 7/123
USPC ........................................................ 521/50.5
See application file for complete search history.

(56) References Cited

U.S. PATENT DOCUMENTS

| 4,108,814 A | 8/1978 | Reiff et al. |
| 4,250,005 A * | 2/1981 | Lamplugh .................... 521/50.5 |
| 4,771,078 A * | 9/1988 | Schisler et al. ............... 521/50.5 |
| 5,684,081 A | 11/1997 | Dannhorn et al. |
| 5,990,192 A | 11/1999 | Gerlitz et al. |
| 6,207,744 B1 | 3/2001 | Paulus et al. |
| 6,455,600 B1 | 9/2002 | Hahnle et al. |
| 2005/0027024 A1 * | 2/2005 | Zhang et al. .................... 521/50 |
| 2006/0020049 A1 | 1/2006 | Champ et al. |
| 2006/0240264 A1 | 10/2006 | Gertzmann et al. |
| 2008/0145563 A1 | 6/2008 | Heischkel et al. |
| 2009/0208727 A1 | 8/2009 | Meyer-Ahrens et al. |
| 2011/0014431 A1 * | 1/2011 | Fowler .......................... 428/172 |
| 2011/0275727 A1 * | 11/2011 | Yamamoto et al. .......... 521/50.5 |

FOREIGN PATENT DOCUMENTS

| CA | 1021898 A1 | 11/1977 |
| CA | 2253119 A1 | 5/1999 |
| DE | 2328850 A1 | 12/1973 |
| DE | 2446440 A1 | 4/1976 |
| DE | 3127945 A1 | 1/1983 |
| DE | 3316592 A1 | 11/1984 |
| DE | 4040290 A1 | 7/1992 |
| DE | 19809540 A1 | 9/1999 |
| DE | 102008000478 A1 | 9/2008 |
| EP | 222680 A2 | 5/1987 |
| EP | 753531 A1 | 1/1997 |
| EP | 870788 A2 | 10/1998 |
| EP | 916647 A2 | 5/1999 |
| EP | 0942022 A1 | 9/1999 |
| EP | 1717257 A1 | 11/2006 |
| GB | 2414021 A | 11/2005 |
| JP | 1993044175 | 2/1993 |
| JP | 2008156544 A | 7/2008 |
| WO | WO-01/21693 A1 | 3/2001 |
| WO | WO-2004/035668 A2 | 4/2004 |
| WO | WO-2006/089935 A1 | 8/2006 |
| WO | WO-2008/101661 A1 | 8/2008 |
| WO | WO-2009/100837 A1 | 8/2009 |
| WO | WO-2011/010719 A1 | 1/2011 |

OTHER PUBLICATIONS

International Search Report for PCT/EP2011/053288 mailed Aug. 2, 2011.

* cited by examiner

*Primary Examiner* — Melissa Rioja
(74) *Attorney, Agent, or Firm* — Drinker Biddle & Reath LLP

(57) ABSTRACT

The present invention relates to a process for the production of radiation-cured foams, characterized in that the radiation-cured foams are produced by 1) foaming of an aqueous composition A), 2) thermal drying of the foam produced from step 1), 3) curing of the foam by actinic radiation, the radiation-curable aqueous compositions A), the radiation-cured foams produced by the process according to the invention and the use of the radiation-cured foams for coating substrates.

8 Claims, No Drawings

RADIATION-CURABLE WHIPPED FOAMS

RELATED APPLICATIONS

This application is a national stage application (under 35 U.S.C. §371) of PCT/EP2011/053288, filed Mar. 4, 2011, which claims benefit of German Patent Application No. 10 2010 010 621.6, filed Mar. 9, 2010.

The present invention describes radiation-curable aqueous compositions for the production of radiation-curable whipped foams, a process for the production of radiation-cured foams and the use of these foams in textiles.

Aqueous polyurethane dispersions are used for applications in the field of upholstered furniture, work safety and automobile interior trim because of their excellent foamability, their good abrasion resistance and resistance to scratching, buckling and hydrolysis. Since the introduction of the transfer process, the production for example of articles with a leather-like appearance has become possible (U. Meier-Westhues, Polyurethane, Vincentz Verlag, Hannover, 2007, p. 199-207).

In the transfer process for the production of imitation leather, a top coat is first applied to a release paper (paper coated with silicone or polypropylene) and is dried thermally, since the top coat as a rule comprises melamine- or polyisocyanate-crosslinked lacquers based on polyurethane dispersions (2C system). A layer of whipped foam follows, which is a polyurethane dispersion which has been whipped up with air and is likewise dried thermally at above 140° C. The dried foam layer is then provided with a laminating adhesive (adhesive coat) and transferred on to a textile, e.g. Elastan®. In order to generate e.g. a grained look typical of leather, the release paper is grained accordingly. In the transfer process, the top layer and the whipped foam layer flow around the grain pattern on the release paper and then cure in this form with the corresponding grain pattern. This method of copying the pattern with the grained look is necessary, since once cured, whipped foam can no longer be subsequently mechanically embossed because of its high restoring force.

In the direct brushing process (U. Meier-Westhues, Polyurethane, Vincentz Verlag, Hannover, 2007, p. 199-207) the polyurethane dispersion whipped up with air is applied directly to the textile and dried thermally above 140° C. The top coat follows with thermal drying. Although the direct brushing process dispenses with the adhesive coat and therefore with one working step compared with the transfer process, it is less suitable for the production of imitation leather, since the subsequent embossing of a grained look is not possible because of the high restoring force of the whipped foam. Furthermore, the use of heat-sensitive textiles, such as e.g. Elastan®, is not possible, since drying of the whipped foam takes place on the textile.

The two processes do not satisfactorily meet all the requirements necessary for the production of foams for the textile sector, especially in the case of textiles such as, for example, imitation leather. The three-stage transfer process for the production of, for example, imitation leather is labour-intensive due to the many working steps and energy-intensive due to the thermal drying steps. The direct brushing process requires high temperatures for the curing and is therefore unsuitable for processing heat-sensitive textiles, such as, for example, Elastan®. Furthermore, mechanical embossing of the foam cannot be realized in the direct brushing process, since the cured foams have a high restoring force, which is a disadvantage for mechanical embossing. In both processes a melamine- or polyisocyanate-crosslinked top coat is used to impart good resistances to chemicals to the whipped foam. 2-component systems furthermore have the disadvantage of having a pot life, so that processing of the mixed lacquer is limited with respect to time, and recycling of unused lacquer is not possible. In addition, crosslinking via melamine in the top coat is likewise carried out a temperatures of 160° C., so that this is likewise unsuitable for heat-sensitive textiles.

WO-A 2009100837 and DE-A 102006016638 disclose whipped foams based on polyurethane dispersions which are dried at a temperature of 160° C.

EP-A 222680 discloses radiation-curable urethane acrylates in an acrylate monomer which are whipped up to a foam and then cured. These are non-aqueous systems which require large amounts of low molecular weight acrylate monomers in order to be sufficiently thinly liquid for the foaming. The acrylate monomers are irritating to sensitizing and therefore limit the processability.

In DE-A 3127945, polyepoxyacrylates are foamed by a polyisocyanate-water reaction and then cured by radiation. The small amount of water used in the recipe is required for the chemical reaction with the polyisocyanate. These systems have a very short pot life, and curing is limited to electron beam curing.

In DE-A 2328850, a polyether polyol or polyester polyol is foamed by a polyisocyanate-water reaction in the presence of low molecular weight acrylate monomers and then cured by radiation.

JP-A 2008156544 discloses radiation-curable foams which are based on polyisocyanate, polyols and an unsaturated isocyanate. These are non-aqueous systems with a very short pot life.

JP-A 1993044175 describes a polyurethane which is not radiation-curable and is foamed in the presence of low molecular weight acrylate monomers and then cured with an electron beam.

Radiation-curable aqueous polyurethane acrylate dispersions are known, such as e.g. in EP-A 753 531, EP-A 870 788 and EP-A 942 022. They are employed as binders for lacquers and as adhesives. Their use in radiation-curable foams has not hitherto been described.

There was therefore the object of providing dispersions which are equal to aqueous polyurethane dispersions in excellent foamability, good abrasion resistance and resistance to scratching, buckling and hydrolysis. The object was to improve the process for curing the whipped foams based on aqueous polyurethane dispersions with respect to speed and lower temperatures. Furthermore, the foam recipes must be processable for a long time, i.e. as far as possible have no pot life, and must be immediately resistant to chemicals after the curing. The foams moreover must have a low restoring force, so that they can be embossed mechanically, and the embossing must be easy to fix. After the fixing or curing, on the other hand, the foams should have a high restoring force.

It has been found, surprisingly, that radiation-curable aqueous polyurethane (meth)acrylate dispersions can be readily foamed mechanically, and that the whipped foams produced in this way can be completely through-cured via actinic radiation after evaporating off the water in air. Through-curing of the foam to the carrier material was not to be expected because of the high layer thickness, since high-energy radiation is absorbed to an ever greater extent with increasing layer thickness (Lambert-Beer law). Moreover, it could have been presumed that because of the large surface area of the foam structure, an increased inhibition of the free radical polymerization by atmospheric oxygen takes place (R. Schwalm, UV Coatings, Elsevier, Amsterdam, 2007, p. 179-194). The radiation-cured foams are distinguished by a high resistance to ethanol directly after curing. Furthermore, after embossing of the foam, before curing with actinic radiation, the embossing can be fixed spontaneously and permanently by means of radiation curing. Because of the rapid curing even at low temperatures, heat-sensitive textiles are also suitable as the substrate. Furthermore, the foam recipe is processable for a long time and has no pot life.

This invention provides a process for the production of radiation-cured foams, characterized in that the radiation-cured foams are produced by 1) foaming of an aqueous composition A),
2) thermal drying of the foam produced from step 1),
3) curing of the foam by actinic radiation, it being possible for steps 2) and 3) to be used in any desired sequence and repeatedly.

The radiation-cured foam according to the invention is optionally provided with a top coat.

This invention furthermore provides radiation-curable aqueous compositions A) comprising A1) one or more radiation-curable aqueous binders,
A2) one or more thickeners,
A3) one or more foam stabilizers.

80 to 99.8 wt. % of component A1), 0.1 to 10 wt. % of component A2) and 0.1 to 10 wt. % of component A3) are preferred, the amounts stated being based on the corresponding anhydrous components A1) to A3) and the sum of the anhydrous individual components adding up to 100 wt. %.

Suitable radiation-curable aqueous binders A1) are, for example, dispersions which contain unsaturated radiation-curable groups, such as e.g. dispersions which contain unsaturated radiation-curable groups and are based on polyester, polyurethane, polyepoxy(meth)acrylate, polyether, polyamide, polysiloxane, polycarbonate, polyepoxyacrylate, polyester acrylate, polyurethane polyacrylate and/or polyacrylate. In this context, the unsaturated radiation-curable groups can be present bonded to one of the polymers mentioned and/or present in the form of radiation-curable monomers, so-called reactive diluents, in dispersion alongside the polymers mentioned.

Radiation-curable aqueous binders such as can be employed as component A1) are commercially obtainable e.g. as Bayhydrol® UV (Bayer MaterialScience AG, Leverkusen, DE), Lux® (Alberdingk & Boley GmbH, Krefeld, DE), Ucecoat® (Cytec Industries Inc., Drogenbos, Belgium), Laromer® (BASF SE, Ludwigshafen, DE), Craymul® (Cray Valley, Paris La Défense, France) and Neo-Rad® (DSM Neoresins, Waalwijk, The Netherlands).

Binders which are preferably employed as component A1) are radiation-curable aqueous binders based on polyurethane (meth)acrylates (i) comprising as builder components A1.1) one or more compounds with at least one group which is reactive towards isocyanate and at least one unsaturated group which can undergo free radical polymerization,
A1.2) one or more monomeric and/or polymeric compounds which differ from A1.1),
A1.3) one or more compounds with at least one group which is reactive towards isocyanate and additionally at least one group having a hydrophilizing action,
A1.4) one or more organic polyisocyanates and
A1.5) optionally compounds which differ from A1.1) to A1.3) and have at least one amine function.

In addition to the polyurethane (meth)acrylate (i), one or more reactive diluents (ii) containing at least one radiation-curable unsaturated group can also be present in the aqueous dispersion. In the context of this invention, "(meth)acrylate" relates to corresponding acrylate or methacrylate functions or to a mixture of the two.

It is advantageous if the content of radiation-curable double bonds of builder component (i) and (ii) is between 0.3 and 6.0, preferably between 0.4 and 4.0, particularly preferably between 0.5 and 3.0 mol/kg of non-aqueous constituents of the dispersion.

Component A1.1) comprises one or more compounds chosen from the group consisting of polyester (meth)acrylates, polyether (meth)acrylates, polyether-ester (meth)acrylates, and unsaturated polyesters with allyl ether structural units and polyepoxy(meth)acrylates with an OH number in the range of from 15 to 300 mg of KOH/g of substance and monohydroxy-functional alcohols containing (meth)acrylate groups.

Of the polyester (meth)acrylates, the polyester (meth)acrylates which contain hydroxyl groups and have an OH number in the range of from 15 to 300 mg of KOH/g of substance, preferably from 60 to 200 mg of KOH/g of substance, are employed as component A1.1). In total 7 groups of monomer constituents can be used as component A1.1) in the preparation of the hydroxy-functional polyester (meth)acrylates.

The first group (a) contains alkanediols or diols or mixtures of these. The alkanediols have a molecular weight in the range of from 62 to 286 g/mol. The alkanediols are preferably chosen from the group of ethanediol, 1,2- and 1,3-propanediol, 1,2-, 1,3- and 1,4-butanediol, 1,5-pentanediol, 1,6-hexanediol, neopentyl glycol, cyclohexane-1,4-dimethanol, 1,2- and 1,4-cyclohexanediol, 2-ethyl-2-butylpropanediol. Preferred diols are diols containing ether oxygen, such as diethylene glycol, triethylene glycol, tetraethylene glycol, dipropylene glycol, tripropylene glycol, polyethylene, polypropylene or polybutylene glycols with a number-average molecular weight Mn in the range of from 200 to 4,000, preferably 300 to 2,000, particularly preferably 450 to 200 g/mol. Reaction products of the abovementioned diols with ε-caprolactone or other lactones can likewise be employed as diols.

The second group (b) contains trifunctional and more than trifunctional alcohols having a molecular weight in the range of from 92 to 254 g/mol and/or polyethers started on these alcohols. Particularly preferred trifunctional and more than trifunctional alcohols are glycerol, trimethylolpropane, pentaerythritol, dipentaerythritol and sorbitol. A particularly preferred polyether is the reaction product of 1 mol of trimethylolpropane with 4 mol of ethylene oxide.

The third group (c) contains monoalcohols. Particularly preferred monoalcohols are chosen from the group of ethanol, 1- and 2-propanol, 1- and 2-butanol, 1-hexanol, 2-ethylhexanol, cyclohexanol and benzyl alcohol.

The fourth group (d) contains dicarboxylic acids having a molecular weight in the range of from 104 to 600 g/mol and/or anhydrides thereof. Preferred dicarboxylic acids and anhydrides thereof are chosen from the group of phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecandioic acid, hydrogenated dimers of fatty acids such as are listed under the sixth group (f).

The fifth group (e) contains trimellitic acid or trimellitic anhydride.

The sixth group (f) contains monocarboxylic acids, such as e.g. benzoic acid, cyclohexanecarboxylic acid, 2-ethylhexanoic acid, caproic acid, caprylic acid, capric acid, lauric acid, and natural and synthetic fatty acids, such as e.g. lauric, myristic, palmitic, margaric, stearic, behenic, cerotic, palmitoleic, oleic, icosenic, linoleic, linolenic and arachidonic acid.

The seventh group (g) contains acrylic acid, methacrylic acid and/or dimeric acrylic acid.

Suitable polyester (meth)acrylates A1.1) containing hydroxyl groups contain the reaction product of at least one constituent of group (a) or (b) with at least one constituent from group (d) or (e) and at least one constituent from group (g).

Particularly preferred constituents from group (a) are chosen from the group consisting of ethanediol, 1,2- and 1,3-propanediol, 1,4-butanediol, 1,6-hexanediol, neopentyl glycol, cyclohexane-1,4-dimethanol, 1,2- and 1,4-cyclohexanediol, 2-ethyl-2-butylpropanediol, diols containing ether oxygen, chosen from the group of diethylene glycol, triethylene glycol, tetraethylene glycol, dipropylene glycol, and tripropylene glycol. Preferred constituents from group (b) are chosen from the group of glycerol, trimethylolpropane, pentaerythritol or the reaction product of 1 mol of trimethylolpropane with 4 mol of ethylene oxide. Particularly preferred constituents from groups (d) and (e) are chosen from the group of phthalic anhydride, isophthalic acid, tetrahydrophthalic anhydride, hexahydrophthalic acid, hexahydrophthalic anhydride, maleic anhydride, fumaric acid, succinic anhydride, glutaric acid, adipic acid, dodecandioic acid, hydrogenated dimers of fatty acids such as are listed under the 6th group (f) and trimellitic anhydride. The preferred constituent from group (g) is acrylic acid.

Groups having a dispersing action which are generally known from the prior art can optionally also be incorporated into these polyester (meth)acrylates. Thus, polyethylene glycols and/or methoxypolyethylene glycols can be used as a proportion of the alcohol component. Polyethylene glycols, polypropylene glycols started on alcohols and block copolymers thereof and the monomethyl ethers of these polyglycols can be used as compounds. Polyethylene glycol monomethyl ether having a number-average molecular weight Mn in the range of from 500 to 1,500 g/mol is particularly suitable.

It is furthermore possible, after the esterification, to react some of the still free, non-esterified carboxyl groups, in particular those of (meth)acrylic acid, with mono-, di- or polyepoxides. Preferred polyepoxides are the glycidyl ethers of monomeric, oligomeric or polymeric bisphenol A, bisphenol F, hexanediol and/or butanediol or ethoxylated and/or propoxylated derivatives thereof. This reaction can be used, in particular, for increasing the OH number of the polyester (meth)acrylate, since in each case an OH group is formed in the polyepoxide-acid reaction. The acid number of the resulting product is between 0 and 20 mg of KOH/g, preferably between 0 and 10 mg of KOH/g and particularly preferably between 0 and 5 mg of KOH/g of substance. The reaction is preferably catalysed by catalysts, such as triphenylphosphine, thiodiglycol, ammonium and/or phosphonium halides and/or compounds of zirconium or tin, such as tin(II) ethylhexanoate.

The preparation of polyester (meth)acrylates is described on page 3, line 25 to page 6, line 24 of DE-A 4 040 290, on page 5, line 14 to page 11, line 30 of DE-A 3 316 592 and page 123 to 135 of P. K. T. Oldring (ed.) in Chemistry & Technology of UV & EB Formulations For Coatings, Inks & Paints, vol. 2, 1991, SITA Technology, London.

Polyether (meth)acrylates which contain hydroxyl groups and originate from the reaction of acrylic acid and/or methacrylic acid with polyethers are likewise suitable as component A1.1), thus e.g. homo-, co- or block copolymers of ethylene oxide, propylene oxide and/or tetrahydrofuran on any desired hydroxy- and/or amine-functional starter molecules, such as e.g. trimethylolpropane, ethylene glycol, propylene glycol, diethylene glycol, dipropylene glycol, glycerol, pentaerythritol neopentyl glycol, butanediol and hexanediol.

The polyepoxy(meth)acrylates, which are known per se, which contain hydroxyl groups and have an OH number in the range of from 20 to 300 mg of KOH/g, preferably from 100 to 280 mg of KOH/g, particularly preferably from 150 to 250 mg of KOH/g or polyurethane (meth)acrylates which contain hydroxyl groups and have an OH number in the range of from 20 to 300 mg of KOH/g, preferably from 40 to 150 mg of KOH/g, particularly preferably from 50 to 140 mg of KOH/g, are likewise suitable as component A1.1). Such compounds are likewise described on page 37 to 56 in P. K. T. Oldring (ed.), Chemistry & Technology of UV & EB Formulations For Coatings, Inks & Paints, vol. 2, 1991, SITA Technology, London. Polyepoxy(meth)acrylates containing hydroxyl groups are based in particular on reaction products of acrylic acid and/or methacrylic acid with polyepoxides (glycidyl compounds) of monomeric, oligomeric or polymeric bisphenol A, bisphenol F, hexanediol and/or butanediol or ethoxylated and/or propoxylated derivatives thereof.

Monohydroxy-functional alcohols containing (meth)acrylate groups are likewise suitable as component A1.1). Such monohydroxy-functional alcohols containing (meth)acrylate groups are, for example, 2-hydroxyethyl (meth)acrylate, caprolactone-lengthened modifications of 2-hydroxyethyl (meth)acrylate, such as Pemcure® 12A (Cognis, DE), 2-hydroxypropyl (meth)acrylate, 4-hydroxybutyl (meth)acrylate, 3-hydroxy-2,2-dimethylpropyl (meth)acrylate, the di-, tri- or penta(meth)acrylates, which are on average monohydroxy-functional, of polyhydric alcohols, such as trimethylolpropane, glycerol, pentaerythritol, ditrimethylolpropane, dipentaerythritol, ethoxylated, propoxylated or alkoxylated trimethylolpropane, glycerol, pentaerythritol, ditrimethylolpropane, dipentaerythritol or technical grade mixtures thereof.

Alcohols which can be obtained from the reaction of acids containing double bonds with monomeric polyepoxide compounds which optionally contain double bonds can moreover also be employed as monohydroxy-functional alcohols containing (meth)acrylate groups. Preferred reaction products are chosen from the group of (meth)acrylic acid with glycidyl (meth)acrylate or the glycidyl ester of a tertiary saturated monocarboxylic acid. Tertiary saturated monocarboxylic acids are, for example, 2,2-dimethylbutyric acid, ethylmethylbutyric, ethylmethylpentanoic, ethylmethylhexanoic, ethylmethylheptanoic and/or ethylmethyloctanoic acid.

Hydroxy-functional acrylates as listed under component A1.1) with an OH functionality of from 1.5 to 2.5, preferably 1.8 to 2.2, particularly preferably 1.9 to 2.1, are particularly preferred.

The compounds listed under component A1.1) can be used by themselves or also as mixtures.

Component A1.2) comprises monomeric mono-, di- and/or triols in each case having a molecular weight of from 32 to 240 g/mol, such as e.g. methanol, ethanol, 1-propanol, 1-butanol, 1-pentanol, 1-hexanol, 2-propanol, 2-butanol, 2-ethylhexanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), diols derived from dimer fatty acids, 2,2-dimethyl-3-hydroxypropionic acid (2,2-dimethyl-3-hydroxypropyl ester), glycerol, trimethylolethane, trimethylolpropane, trimethylolbutane and/or castor oil. Neopentyl glycol, 1,4-butanediol, 1,4-cyclohexanedimethanol, 1,6-hexanediol and/or trimethylolpropane are preferred.

Component A1.2) furthermore comprises oligomeric and/or polymeric hydroxy-functional compounds. These oligomeric and/or polymeric hydroxy-functional compounds are, for example, polyesters, polycarbonates, polyether-carbonate polyols, C2-, C3- and/or C4-polyethers, polyether esters and/or polycarbonate polyesters having a functionality of from 1.0 to 3.0, in each case with a weight-average of the molecular weight Mw in the range of from 300 to 4,000, preferably 500 to 2,500 g/mol.

Hydroxy-functional polyester alcohols are those based on mono-, di- and tricarboxylic acids with monomeric di- and triols, such as have already been listed as component A1.2), and polyester alcohols based on lactones. The carboxylic acids are, for example, phthalic acid, isophthalic acid, terephthalic acid, trimellitic acid, adipic acid, maleic acid, fumaric acid, tetrahydrophthalic acid, hexahydrophthalic acid, malonic acid, succinic acid, glutaric acid, pimelic acid, suberic acid, sebacic acid, dodecanedioic acid, hydrogenated dimers of fatty acids and saturated and unsaturated fatty acids, such as e.g. palmitic acid, stearic acid, myristoleic acid, palmitoleic acid, oleic acid, linoleic acid, linolenic acid, castor oil acid and technical grade mixtures thereof. Of the di- and tricarboxylic acids, the analogous anhydrides can also be used.

Hydroxy-functional polyether-ols are obtainable, for example, by polymerization of cyclic ethers or by reaction of alkylene oxides with a starter molecule.

Hydroxy-functional polycarbonates are hydroxyl-terminated polycarbonates, the polycarbonates accessible by reaction of diols, lactone-modified diols or bisphenols, e.g. bisphenol A, with phosgene or carbonic acid diesters, such as diphenyl carbonate or dimethyl carbonate. Hydroxy-functional polyether carbonate polyols are those such as are described for building up polyurethane dispersions in DE-A 102008000478.

The polymeric hydroxy-functional polyesters, polycarbonates, polyether carbonate polyols, C2-, C3- and/or C4-polyethers, polyether esters and/or polycarbonate polyesters with an average OH functionality of from 1.8 to 2.3, particularly preferably 1.9 to 2.1, are preferred as component A1.2).

Component A1.3) comprises polyisocyanates chosen from the group of aromatic, araliphatic, aliphatic or cycloaliphatic polyisocyanates or mixtures of such polyisocyanates. Suitable polyisocyanates are e.g. 1,3-cyclohexane-diisocyanate, 1-methyl-2,4-diisocyanato-cyclohexane, 1-methyl-2,6-diisocyanato-cyclohexane, tetramethylene-diisocyanate, 4,4'-diisocyanatodiphenylmethane, 2,4'-diisocyanatodiphenylmethane, 2,4-diisocyanatotoluene, 2,6-diisocyanatotoluene, α,α,α',α'-tetramethyl-m- or -p-xylylene-diisocyanate, 1,6-hexamethylene-diisocyanate, 1-isocyanato-3,3,5-trimethyl-5-isocyanatomethylcyclohexane (isophorone-diisocyanate or IPDI), 4,4'-diisocyanato-dicyclohexylmethane, 4-isocyanatomethyl-1,8-octane-diisocyanate (triisocyanatononane, TIN) (EP-A 928 799), homologues or oligomers of these polyisocyanates listed with biuret, carbodiimide, isocyanurate, allophanate, iminooxadiazinedione and/or uretdione groups, and mixtures thereof.

Compounds with at least two free isocyanate groups, at least one allophanate group and at least one C=C double bond which can undergo free radical polymerization and is bonded via the allophanate group, such as are described as component a) in WO-A 2006089935, are likewise suitable as component A1.3).

1,6-Hexamethylene-diisocyanate, 1-isocyanato-3,3,5-trimethyl-5-isocyanatomethylcyclohexane (isophorone-diisocyanate or IPDI) and 4,4'-diisocyanato-dicyclohexylmethane, homologues or oligomers of 1,6-hexamethylene-diisocyanate, 1-isocyanato-3,3,5-trimethyl-5-isocyanatomethylcyclohexane (isophorone-diisocyanate or IPDI) and 4,4'-diisocyanato-dicyclohexylmethane with biuret, carbodiimide, isocyanurate, allophanate, iminooxadiazinedione and/or uretdione groups and allophanate (meth) acrylates as described in WO-A 2006089935 and mixtures thereof are preferred as component A1.3).

Component A1.4) comprises compounds with at least one group which is reactive towards isocyanate and additionally at least one group having a hydrophilizing action.

The groups having a hydrophilizing action include ionic groups A1.4.1) and/or the ionic groups A.1.4.1) which originate from potentially ionic groups A.1.4.2) (for example by salt formation) and which can be of anionic nature A.1.4.1.1), such as, for example, sulfonium, phosphonium, carboxylate, sulfonate, phosphonate groups, or of cationic nature A.1.4.1.2), such as, for example, ammonium groups, potentially ionic groups A.1.4.2), i.e. groups which can be converted into ionic groups A.1.4.1), for example by salt formation, and/or nonionic groups A.1.4.3), such as, for example, polyether groups, which can be incorporated into the macromolecules by isocyanate-reactive groups. Isocyanate-reactive groups which are preferably suitable are hydroxyl and amino groups.

Compounds containing potentially ionic groups A.1.4.2) include compounds with potentially anionic groups A.1.4.2.1), such as, for example, mono- and dihydroxycarboxylic acids, mono- and diaminocarboxylic acids, mono- and dihydroxysulfonic acids, mono- and diaminosulfonic acids, mono- and dihydroxyphosphonic acids, mono- and diaminophosphonic acids and/or compounds with potentially cationic groups A.1.4.2.2), such as, for example, ethanolamine, diethanolamine, triethanolamine, 2-propanolamine, dipropanolamine, tripropanolamine, N-methylethanolamine, N-methyldiethanolamine and N,N-dimethylethanolamine.

Preferred compounds containing potentially anionic groups A.1.4.2.1) are chosen from the group consisting of dimethylolpropionic acid, dimethylolbutyric acid, hydroxypivalic acid, N-(2-aminoethyl)-alanine, 2-(2-amino-ethylamino)-ethanesulfonic acid, ethylenediamine-propyl- or -butylsulfonic acid, 1,2- or 1,3-propylenediamine-ethylsulfonic acid, 3-(cyclohexylamino)propane-1-sulfonic acid, malic acid, citric acid, glycollic acid, lactic acid, glycine, alanine, taurine, lysine, 3,5-diaminobenzoic acid, an addition product of isophoronediamine (1-amino-3,3,5-trimethyl-5-aminomethylcyclohexane, IPDA) and acrylic acid (EP-A 916 647, Example 1), the adduct of sodium bisulfite on but-2-ene-1,4-diol polyether sulfonate and the propoxylated adduct of 2-butenediol and $NaHSO_3$, as described in DE-A 2 446 440 on page 5-9, formula I-III.

Particularly preferred compounds containing potentially ionic groups A.1.4.2) are compounds containing carboxyl, sulfonic acid groups and/or tertiary amino groups, such as, for example, 2-(2-amino-ethylamino)-ethanesulfonic acid, 3-(cyclohexylamino)propane-1-sulfonic acid, the addition product of isophoronediamine and acrylic acid (EP-A 916 647, Example 1), hydroxypivalic acid, dimethylolpropionic acid, triethanolamine, tripropanolamine, N-methyldiethanolamine and/or N,N-dimethylethanolamine.

Component A.1.4) very particularly preferably comprises hydroxypivalic acid and/or dimethylolpropionic acid as compounds with potentially ionic groups.

Suitable groups A.1.4.3) having a non-ionically hydrophilizing action are, for example, polyalkylene oxide ethers which contain at least one hydroxyl or amino group and one or more alkylene oxide units, at least one of which is an ethylene oxide unit. These polyalkylene oxide ethers are accessible in a manner known per se by alkoxylation of suitable starter molecules.

Suitable starter molecules are, for example, saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, such as, for example, diethylene glycol monobutyl ether, unsaturated alcohols, such as allyl alcohol, 1,1-dimethylallyl alcohol or oleyl alcohol, aromatic alcohols, such as phenol, the isomeric cresols or methoxyphenols, araliphatic alcohols, such as benzyl alcohol, anisyl alcohol or cinnamyl alcohol, secondary monoamines, such as dimethylamine, diethylamine, dipropylamine, diisopropylamine, dibutylamine, bis-(2-ethylhexyl)-amine, N-methyl- and N-ethylcyclohexylamine or dicyclohexylamine, and heterocyclic secondary amines, such as morpholine, pyrrolidine, piperidine or 1H-pyrazole. Trimethylolpropane which is alkoxylated on only one OH group is likewise suitable. Preferred starter molecules are saturated monoalcohols and trimethylolpropane which is alkoxylated on only one OH group. Diethylene glycol monobutyl ether is particularly preferably used as the starter molecule.

Alkylene oxides which are suitable for the alkoxylation reaction are, for example, ethylene oxide, 1-butene oxide and propylene oxide, which can be employed in the alkoxylation reaction in any desired sequence or also in a mixture.

The polyalkylene oxide polyether alcohols are either pure polyethylene oxide polyethers or mixed polyalkylene oxide polyethers, the alkylene oxide units of which include ethylene oxide units to the extent of at least 30 mol %, preferably to the extent of at least 40 mol %. Preferred nonionic compounds are monofunctional mixed polyalkylene oxide polyethers which contain at least 40 mol % of ethylene oxide units and not more than 60 mol % of propylene oxide units. Polyalkylene oxides which are started on trimethylolpropane and have an OH functionality of 2, such as e.g. Tegomer® D 3403 (Evonik Industries AG, Essen, DE) and Ymer® N 120 (Perstorp AB, Sweden) are likewise preferred.

The acids mentioned under component A.1.4.2.1) are converted into the corresponding salts by reaction with neutralizing agents, such as triethylamine, ethyldiisopropylamine, dimethylcyclohexylamine, dimethylethanolamine, ammonia, N-ethylmorpholine, LiOH, NaOH and/or KOH. In this context, the degree of neutralization is preferably between 50 and 125%. The degree of neutralization is defined as follows: In the case of acid-functionalized polymers, as the quotient of base and acid; in the case of base-functionalized polymers, as the quotient of acid and base. If the neutralization is above 100%, in the case of acid-functionalized polymers more base is added than there are acid groups in the polymer; in the case of base-functionalized polymers more acid is added than there are base groups in the polymer.

The bases mentioned under component A.1.4.2.2) are converted into the corresponding salts by reaction with neutralizing agents, such as e.g. inorganic acids, such as, for example, hydrochloric acid, phosphoric acid and/or sulfuric acid, and/or organic acids, such as, for example, formic acid, acetic acid, lactic acid, methane-, ethane- and/or p-toluenesulfonic acid. In this context, the degree of neutralization is preferably between 50 and 125%.

The compounds listed under component A.1.4) can also be used in mixtures.

Mono- and diamines and/or mono- or difunctional amino alcohols are used as component A.1.5) to increase the molecular weight of the polyurethane acrylates (i) according to the invention. Preferred diamines are those which are more reactive towards the isocyanate groups than water, since the lengthening of the polyester urethane (meth)acrylates optionally takes place in an aqueous medium. The diamines are particularly preferably chosen from the group of ethylenediamine, 1,6-hexamethylenediamine, isophoronediamine, 1,3- and 1,4-phenylenediamine, piperazine, 4,4'-diphenylmethanediamine, amino-functional polyethylene oxides, amino-functional polypropylene oxides (known under the name Jeffamin® D series [Huntsman Corp. Europe, Zavantem, Belgium]) and hydrazine. Ethylenediamine is very particularly preferred.

Preferred monoamines are chosen from the group of butylamine, ethylamine and amines of the Jeffamin® M series (Huntsman Corp. Europe, Zavantem, Belgium), amino-functional polyethylene oxides, amino-functional polypropylene oxides and/or amino alcohols.

Component (ii) comprises reactive diluents, by which are to be understood compounds which contain at least one group which can undergo free radical polymerization, preferably acrylate and methacrylate groups, and preferably no groups which are reactive towards isocyanate or hydroxyl groups.

Preferred compounds (ii) contain 2 to 6 (meth)acrylate groups, particularly preferred compounds 4 to 6.

Particularly preferred compounds (ii) have a boiling point of more than 200° C. under normal pressure.

Reactive diluents are described generally in P. K. T. Oldring (editor), Chemistry & Technology of UV & EB Formulations for Coatings, Inks & Paints, vol. II, chapter III: Reactive Diluents for UV & EB Curable Formulations, Wiley and SITA Technology, London 1997.

Reactive diluents are, for example, the alcohols methanol, ethanol, 1-propanol, 1-butanol, 1-pentanol, 1-hexanol, 2-propanol, 2-butanol, 2-ethylhexanol, dihydrodicyclopentadienol, tetrahydrofurfuryl alcohol, 3,3,5-trimethylhexanol, octanol, decanol, dodecanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), glycerol, trimethylolethane, trimethylolpropane, trimethylolbutane, pentaerythritol, ditrimethylolpropane, dipentaerythritol and sorbitol esterified completely with (meth)acrylic acid, and ethoxylated and/or propoxylated derivatives of the alcohols listed, and the technical grade mixtures obtained during (meth)acrylation of the abovementioned compounds.

All the processes known from the prior art can be used for the aqueous dispersions based on polyurethane (meth)acrylate which are preferred for the preparation of the aqueous compositions according to the invention, such as emulsifier-shearing force, acetone, prepolymer mixing, melt emulsification, ketimine and solid spontaneous dispersing processes or derivatives thereof. These methods are known to the person skilled in the art, see e.g. Methoden der Organischen Chemie, Houben-Weyl, 4th edition, volume E20/part 2 on page 1659, Georg Thieme Verlag, Stuttgart, 1987. The melt emulsification and the acetone process are preferred. The acetone process is particularly preferred.

In addition to the radiation-curable aqueous binder(s), component (A1) can also comprise dispersions based on polyesters, polyurethanes, polyethers, polyamides, polysiloxanes, polyvinyl ethers, polybutadienes, polyisoprenes, chlorinated rubbers, polycarbonates, polyvinyl esters, polyvinyl chlorides, polyacrylates and/or polyurethanes which contain no unsaturated radiation-curable groups. The degree of crosslinking density can thus be reduced, the physical drying can be influenced, e.g. accelerated, or an elastification or also an adjustment of the adhesion can be carried out.

In addition to the radiation-curable aqueous binder(s), component A1) can also comprise those dispersions based on polyesters, polyurethanes, polyethers, polyamides, polyvinyl esters, polyvinyl ethers, polysiloxanes, polycarbonates and/or polyacrylates which contain functional groups, such as alkoxysilane groups, hydroxyl groups and/or isocyanate groups optionally present in blocked form. Dual cure systems which can be cured via two different mechanisms can thus be prepared.

So-called crosslinking agents can likewise be added to the component A1) dual cure systems. Non-blocked and/or blocked polyisocyanates, polyaziridines, polycarbodiimides and melamine resins are preferably possible. Non-blocked and/or blocked hydrophilized polyisocyanates are particularly preferred. Preferably ≤20 wt. %, particularly preferably ≤10 wt. % of solid crosslinking agent, based on the solids content of the aqueous radiation-curable binder A1), is added.

Amino crosslinker resins, on a melamine or urea basis, and/or polyisocyanates with free or with blocked polyisocyanate groups, based on polyisocyanates, optionally containing hydrophilizing groups, from hexamethylene-diisocyanate, isophorone-diisocyanate and/or toluylidene-diisocyanate with urethane, uretdione, iminooxadiazinedione, isocyanurate, biuret and/or allophanate structures can also be added to component A1). Carbodiimides or polyaziridines are also possible as further dual cure systems.

It is advantageous if the content of radiation-curable unsaturated groups of component A1) is between 0.3 and 6.0, preferably between 0.4 and 4.0, particularly preferably between 0.5 and 3.0 mol/kg of non-aqueous constituents of the dispersion.

It is advantageous if the radiation-cured free film of component A1) has an elongation at break of from 30 to 1,000%, preferably 150 to 700%. In this context, in addition to the radiation-curable aqueous binder(s), component A1) optionally includes further binders and/or dual cure systems which are not radiation-curable, as described.

It is advantageous if the radiation-cured free film of component A1) has a tear strength of from 2 to 40 N/mm$^2$. In this context, in addition to the radiation-curable aqueous binder(s), component A1) optionally includes further binders and/or dual cure systems which are not radiation-curable, as described.

Suitable foam stabilizers A2) are commercially available stabilizers, such as, for example, water-soluble fatty acid amides, sulfosuccinamides, hydrocarbon-sulfonates, -sulfates or fatty acid salts, wherein the lipophilic radical preferably contains 12 to 24 carbon atoms.

Preferred foam stabilizers A2) are alkane-sulfonates or -sulfates having 12 to 22 carbon atoms in the hydrocarbon radical, alkyl-benzosulfonates or -sulfates having 14 to 24 carbon atoms in the hydrocarbon radical or fatty acid amides or fatty acid salts having 12 to 24 carbon atoms.

The abovementioned fatty acid amides are preferably fatty acid amides of mono- or di-(ethanol)-amines. Fatty acid salts can be, for example, alkali metal salts, amine salts or unsubstituted ammonium salts.

Such fatty acid derivatives are typically based on fatty acids, such as lauric acid, myristic acid, palmitic acid, oleic acid, stearic acid, ricinoleic acid, behenic acid or arachidic acid, coconut fatty acid, tallow fatty acid, soya fatty acid and hydrogenation products thereof.

Particularly preferred foam stabilizers A2) are sodium lauryl sulfate, sulfosuccinamides and ammonium stearates, and mixtures thereof.

Thickeners A3) in the context of the invention are compounds which render it possible to adjust the viscosity of the resulting mixture of A1) to A3) such that the production and processing of the foam according to the invention is promoted. Suitable thickeners are commercially available thickeners, such as, for example, natural organic thickeners, e.g. dextrins or starch, organically modified natural substances, e.g. cellulose ethers or hydroxyethylcellulose, organically fully synthetic thickeners, e.g. polyacrylic acids, polyvinylpyrrolidones, poly(meth)acrylic compounds or polyurethanes (associative thickeners) and inorganic thickeners, e.g. bentonites or silicas. Organic fully synthetic thickeners are preferably employed.

The binders, auxiliary substances and additives known in lacquer technology, such as e.g. pigments, dyestuffs or matting agents, can be added to or combined with the radiation-curable aqueous binder A1). These are flow and wetting additives, slip additives, pigments, including metallic effect pigments, fillers, nanoparticles, light stabilizer particles, antiyellowing additives and additives for reducing surface tension.

The incorporation of components A2) and A3) and optionally further additives and/or dual cure systems described into the radiation-curable aqueous binder A1) is carried out via shearing forces and can be carried out in any desired sequence.

Antioxidants and/or light stabilizers can additionally also be incorporated into the radiation-curable aqueous binders A1). Finally, fillers, plasticizers, pigments, silica sols, dispersions of aluminium or clay, flow agents or thixotropy agents can also be present. Depending on the desired pattern of properties and the intended use of the foams according to the invention, the end product can contain up to 70 wt. %, based on the total dry matter, of such fillers.

Production of foam by foaming of the aqueous composition A) can be carried out by introduction of gas and/or under the action of appropriate shearing energy (e.g. mechanical stirring) or by commercially available blowing agents. Preferably, air or inert gases, such as e.g. nitrogen, carbon dioxide, noble gases, such as, for example, argon, neon, helium, are used as the gas. The use of inert gas for production of the foam may be advantageous in order to suppress the inhibition by oxygen during the free radical polymerization.

Preferably, the foam production in step 1) is carried out with introduction of gas, and the introduction of air with the simultaneous action of shearing energy is particularly preferred.

The foamed composition can be applied to the most diverse surfaces or in moulds in the most diverse manners and ways, such as e.g. pouring, knife-coating, rolling, brushing, spraying or misting. Shaping by an extrusion process is likewise possible.

While the foamed material has a preferred foam density of from 200 to 1,000 g/l, particularly preferably 300 to 600 g/l, before drying, the density of the resulting foam according to the invention after drying is preferably 50 to 600 g/l, particularly preferably 100 to 500 g/l. The foam density is achieved by foaming a defined amount of A) in a defined volume by introduction of gas and/or under the action of shearing energy. The whipping up can be carried out, for example, by means of a kitchen hand mixer or by means of industrial mixers, such as e.g. the Hansa industrial mixer, Mondo mixer, Oakes mixer and Stork foam generator.

The thermal drying of the foam 2) is in general carried out at a temperature of between 25° C. and 150° C., preferably between 30° C. and 120° C., particularly preferably at 40° C. to 90° C. The drying can be carried out in a conventional dryer or in a circulating air oven. Drying in a microwave (HF) dryer or an infra-red dryer is likewise possible. Drying by guiding the substrate provided with foam over heated surfaces, e.g. rollers, is also possible.

After the drying step 2), the foams according to the invention typically have a thickness of from 1 mm to 100 mm, preferably 1 mm to 50 mm, particularly preferably 1 mm to 30 mm, when they are applied as a layer e.g. to a release paper.

The foams according to the invention can also be applied to the most diverse substrates or poured into moulds in several layers, for example to produce particularly high foam thicknesses.

The foamed compositions according to the invention can moreover also be employed in combination with other carrier materials, such as e.g. textile sheet-like structures, paper, mineral substrates, wood, metal, plastic etc., for example by prior application (e.g. coating).

In the context of the present invention, textile sheet-like structures are to be understood as meaning, for example, woven fabric, knitted fabric, bonded and non-bonded non-wovens. The textile sheet-like structures can be built up from synthetic, natural fibres and/or mixtures thereof. Textiles of any desired fibres are in principle suitable for the process according to the invention.

Electromagnetic radiation of which the energy, optionally with the addition of suitable photoinitiators, is sufficient to effect free radical polymerization of (meth)acrylate double bonds is suitable for polymerization induced by radiation chemistry (step 3) of the foam produced in steps 1) and 2).

The polymerization induced by radiation chemistry is preferably carried out by means of radiation with a wavelength of less than 400 nm, such as UV, electron, x- or gamma rays. UV radiation is particularly preferred, the curing with UV radiation being initiated in the presence of photoinitiators. A distinction is made in principle between two type of photoinitiators, the unimolecular type (I) and the bimolecular type (II). Suitable type (I) systems are aromatic ketone compounds, such as e.g. benzophenones in combination with tertiary amines, alkylbenzophenones, 4,4'-bis(dimethylamino)benzophenones (Michler's ketone), anthrone and halogenated benzophenones or mixtures of the types mentioned. Type (II) initiators, such as benzoin and its derivatives, benzil ketals, acylphosphine oxides, 2,4,6-trimethyl-benzoyl-diphenylphosphine oxide, bisacylphosphine oxides, phenylglyoxylic acid esters, camphorquinone, α-aminoalkylphenones, α,α-dialkoxyacetophenones and α-hydroxyalkylphenones, are furthermore suitable. Photoinitiators which can easily be incorporated into aqueous radiation-curable binders are preferred. Such products are, for example, Irgacure® 500 (a mixture of benzophenone and (1-hydroxycyclohexyl)phenyl ketone, Ciba, Lampertheim, DE), Irgacure® 819 DW (phenyl-bis-(2,4,6-trimethylbenzoyl)-phosphine oxide, Ciba, Lampertheim, DE), Esacure® KIP EM (oligo[2-hydroxy-2-methyl-1-[4-(1-methylvinyl)-phenyl]-propanone], Lamberti, Aldizzate, Italy). Mixtures of these compounds can also be employed.

Polar solvents, such as e.g. acetone and isopropanol, can also be employed for incorporation of the photoinitiators.

The radiation curing in step 3) is advantageously carried out at 30 to 70° C., because the degree of conversion of (meth)acrylate groups tends to be increased at a higher temperature. This can result in better resistance properties. Nevertheless, a possible heat-sensitivity of the substrate must be taken into consideration during radiation curing, so that optimum curing conditions for a particular foam-substrate combination are to be determined by the person skilled in the art in simple preliminary experiments.

In this context, the radiation emitter or emitters which initiate the free radical polymerization can be fixed in position and the foam is moved past the emitter by suitable conventional devices, or the radiation emitters can be moved by conventional devices, so that the foam is fixed in position during the curing. It is also possible to carry out the irradiation e.g. in chambers, where the coated substrate is introduced into the chamber and the radiation is then switched on for a certain period of time, and after the irradiation the substrate is removed from the chamber again.

If appropriate, curing is carried out under an inert gas atmosphere, i.e. with exclusion of oxygen, in order to prevent inhibition of the free radical crosslinking by oxygen.

The foams according to the invention can be very readily embossed before the radiation curing, since they have a low restoring force before the radiation curing and the embossing can be fixed within seconds by the radiation curing. Furthermore, the radiation-cured foams are distinguished by good resistances to water and alcoholic solutions.

The foams according to the invention can be treated on the surface after radiation curing, e.g. by grinding, velouring, roughening and/or tumbling.

The radiation-cured foam according to the invention is optionally provided with a top coat in order to impart to the foam better chemical resistances or to modify mechanical, haptic or visual properties. This top coat is based, for example, on aqueous dispersions based on polyesters, polyurethanes, polyethers, polyamides, polysiloxanes, polyvinyl ethers, polybutadienes, polyisoprenes, chlorinated rubbers, polycarbonates, polyvinyl esters, polyvinyl chlorides, polyacrylates and/or polyurethanes. Crosslinking agents can be added to these binders, e.g. amino crosslinker resins, on a melamine or urea basis, and/or polyisocyanates with free or with blocked polyisocyanate groups, based on polyisocyanates, optionally containing hydrophilizing groups, from hexamethylene-diisocyanate, isophorone-diisocyanate and/or toluylidene-diisocyanate with urethane, uretdione, iminooxadiazinedione, isocyanurate, biuret and/or allophanate structures. Carbodiimides or polyaziridines are also possible as further dual cure systems. Preferably, the top coat is based on radiation-curable aqueous binders which, compared with melamine- or polyisocyanate-crosslinked top coats, are crosslinked at lower temperatures within seconds. Suitable radiation-curable aqueous binders are, for example, dispersions which contain unsaturated radiation-curable groups, such as e.g. dispersions which contain unsaturated radiation-curable groups and are based on polyester, polyurethane, polyepoxy(meth)acrylate, polyether, polyamide, polysiloxane, polycarbonate, polyepoxyacrylate, polyester acrylate, polyurethane polyacrylate and/or polyacrylate. In this context, the unsaturated radiation-curable groups can be present bonded to one of the polymers mentioned and/or present in the form of radiation-curable monomers, so-called reactive diluents, in dispersion alongside the polymers mentioned.

The present invention also provides substrates coated with the foams according to the invention. On the basis of the outstanding use properties, the compositions according to the invention and the foams produced from them are suitable in particular for coating or production of, for example, outer clothing, imitation leather articles, shoes, furniture coverings, automobile interior trim articles and sports equipment.

EXAMPLES

The NCO content was in each case monitored titrimetrically in accordance with DIN 53185.

The solids content of the polyurethane dispersion was determined gravimetrically after all the non-volatile constituents had been evaporated off, in accordance with DIN 53216.

The average particle size was determined by laser correlation spectroscopy.

The flow time was determined in accordance with DIN 53211 with the aid of the 4 mm DIN cup. RT corresponds to 23° C.

1) Preparation of a Radiation-Curable Aqueous Polyurethane Acrylate Dispersion, Component A1

76.7 parts of the polyepoxyacrylate AgiSyn® 1010 (AGI Corp., Taipeh, Taiwan), component A1.1), 609.1 parts of the polycarbonate diol Desmophen® C 1200 HN (Bayer MaterialScience AG, Leverkusen, DE), component A1.2), 5.2 parts of neopentyl glycol, component A1.2), 45.2 parts of dimethylolpropionic acid, component A1.3), 82.1 parts of 4,4'-diisocyanato-dicyclohexylmethane, component A1.4), 188.2 parts of 1-isocyanato-3,3,5-trimethyl-5-isocyanatomethylcyclohexane, component A1.4) and 0.2 part of dibutyltin dilaurate were dissolved in 350 parts of acetone and the solution was reacted at 60° C., while stirring, to an NCO content of 2.1 wt. %. Neutralization by addition and stirring in of 36.0 parts of ethyldiisopropylamine followed. The clear solution was then introduced into 1,600 parts of water, while stirring. Thereafter, a mixture of 10.6 parts of ethylenediamine, component A1.5), and 100 parts of water was added to the dispersion, while stirring. The acetone was distilled off from the dispersion under a slight vacuum. A radiation-curable aqueous polyurethane acrylate dispersion 1) having a solids content of 39 wt. %, a flow time of 19 sec, an average particle size of 52 nm and a pH of 8.4 was obtained.

2) Preparation of a Radiation-Curable Aqueous Polyurethane Acrylate Dispersion, Component A1

116.0 parts of 2-hydroxyethyl acrylate, component A1.1), 222.2 parts of 1-isocyanato-3,3,5-trimethyl-5-isocyanatomethylcyclohexane, component A1.4) and 0.003 part of dibutyltin dilaurate were dissolved in 84.5 parts of acetone and the solution was reacted at 60° C., while stirring, to an NCO content of 8.9 wt. %. 560 parts of the polycarbonate diol Desmophen® C 2200 (Bayer MaterialScience AG, Leverkusen, DE), component A1.2), 5.2 parts of neopentyl glycol, component A1.2), 22.0 parts of the monofunctional polyether LB 25 (Bayer MaterialScience AG, Leverkusen, DE), component A1.3), 19.6 parts of dimethylolpropionic acid, component A1.3), 170.3 parts of 4.4'-diisocyanatodicyclohexylmethane, component A1.4), 0.5 part of dibutyltin dilaurate and 730 parts of acetone were added to 108.0 parts of the solution obtained in this way and the mixture was reacted at 60° C., while stirring, to an NCO content of 1.5 wt. %. Neutralization by addition and stirring in of 14.2 parts of triethylamine and 13.0 parts of ethylenediamine, component A1.5), dissolved in 39 ml of water, followed. 1,350 parts of water were then introduced into the clear solution, while stirring. The acetone was then distilled off from the dispersion under a slight vacuum. A radiation-curable aqueous polyurethane dispersion 2) having a solids content of 39 wt. %, a flow time of 13 sec, an average particle size of 146 nm and a pH of 8.6 was obtained.

3) Preparation of a Radiation-Curable Aqueous Polyurethane Acrylate Dispersion, Component A1

46.7 parts of the polyepoxyacrylate AgiSyn® 1010 (AGI Corp., Taipeh, Taiwan), component A1.1), 625.0 parts of a polyester diol based on phthalic anhydride and hexanediol with an OH number of 56, component A1.2), 5.9 parts of hexanediol, component A1.2), 40.2 parts of dimethylolpropionic acid, component A1.3), 75.6 parts of hexamethylenediisocyanate, component A1.4), 153.2 parts of isocyanate-containing allophanate acrylate Laromer® LR 9000 (BASF SE, Ludwigshafen, DE), component A1.4) and 0.4 part of dibutyltin dilaurate were dissolved in 700 parts of acetone and the solution was reacted at 60° C., while stirring, to an NCO content of 0.7 wt. %. Neutralization by addition and stirring in of 27.3 parts of triethylamine and 6.9 parts of ethylenediamine, component A1.5), dissolved in 39 ml of water, followed. 1,700 parts of water were then introduced into the clear solution, while stirring. The acetone was distilled off from the dispersion under a slight vacuum. A radiation-curable aqueous polyurethane dispersion 3) having a solids content of 38 wt. %, a flow time of 180 sec, an average particle size of 157 nm and a pH of 8.0 was obtained.

4) Radiation-Curable Aqueous Polyurethane Acrylate Dispersion, Component A1

Bayhydrol® UV XP 2736 (Bayer MaterialScience AG, Leverkusen, DE), which is anionically hydrophilized and is based on polyester acrylate, served as the radiation-curable aqueous polyurethane dispersion 4).

5) Aqueous Polyurethane Dispersion which is not Radiation-Curable (Comparison)

Impranil® DLC-F (Bayer MaterialScience AG, Leverkusen, DE), which is anionically hydrophilized, served as the aqueous polyurethane dispersion 5) which is not radiation-curable.

TABLE 1

| Formulation of lacquers for the tensile testing | |
|---|---|
| UV lacquer | Parts by weight |
| UV dispersion | 100.0 |
| BYK ® 348[1] | 1.0 |
| Irgacure ® 500[2] | 1.5 |
| Total | 102.5 |

[1]Wetting agent based on a polyether-modified dimethylpolysiloxane from BYK, Wesel, DE
[2]A mixture of benzophenone and (1-hydroxycyclohexyl) phenyl ketone from Ciba, Lampertheim, DE Free films with a layer thickness of 300 μm were produced from the radiation-curable aqueous polyurethane acrylate dispersions 1) to 4). For this, the films were dried at 50° C. for 10 minutes and then subjected to radiation curing with 500 mJ/cm$^2$. The free films were subjected to tensile testing.

Tensile tester Zwicki 2,5KN (Zwick)
Test standard: DIN EN ISO 527-1-3
Test climate: standard climate 23° C. at 50% rel. humidity
Clamping device with re-adjusting compressed air clamps
Clamped length: 40 mm
Preliminary force: 0.02 N/mm$^2$
Test speed: 200 mm/mm$^2$

TABLE 2

Tensile testing of the radiation-cured free films[3]

| | Example | | | |
|---|---|---|---|---|
| | 1) | 2) | 3) | 4) |
| Elongation at break [%] | 206 | 146 | 115 | 80 |
| Tensile strength [N/mm$^2$] | 14 | 23 | 12 | 31 |

[3]Values are based on the mean of five measurements

TABLE 3

Formulation of the foams according to the invention

| Foam | Parts by weight |
|---|---|
| UV dispersion 1) to 4) | 390.0 |
| BYK ® 3484 | 3.9 |
| Irgacure ® 500[5] | 4.9 |
| Irgacure ® 819[6] | 0.9 |
| Dicrylan ® FLN[7] | 23.4 |
| Borchigel ® LW 44[8] | 10.6 |
| Total | 433.7 |

[4]Wetting agent based on a polyether-modified dimethylpolysiloxane from BYK, Wesel, DE
[5]A mixture of benzophenone and (1-hydroxycyclohexyl) phenyl ketone from Ciba, Lampertheim, DE
[6]Bisacylphosphine oxide from Ciba, Lampertheim, DE
[7]Foam stabilizer based on alkylammonium stearate from Huntsman Int. LLC, Salt Lake City, UT, USA
[8]Nonionic thickening agent based on polyurethane from OMG Borchers GmbH, Langenfeld, DE Production of the Foams According to the Invention Wetting agent, photoinitiators and foam stabilizer were incorporated into the UV dispersion by means of shearing forces in accordance with Table 3. Foaming was then carried out by air being whipped in by means of a kitchen hand mixer. All the foams had a final foam density of 500 g/l. Finally, the thickening agent was stirred in. The foams produced in this way had a homogeneous bubble distribution.

The foams were applied in a thickness of 1,000 μm to a release paper by means of a box knife and dried at room temperature for 60 minutes and then at 80° C. in an oven (without circulating air) for eight minutes. The foams were then subjected to radiation curing at 750 mJ/cm$^2$.

TABLE 4

Formulation of the thermally cured foam (comparison)

| Foam | Parts by weight |
|---|---|
| Dispersion 5) | 390.0 |
| BYK ® 3489 | 3.9 |
| Dicrylan ® FLN[10] | 23.4 |
| Borchigel ® LW 44[11] | 10.6 |
| Total | 427.9 |

[9]Wetting agent based on a polyether-modified dimethylpolysiloxane from BYK, Wesel, DE
[10]Foam stabilizer based on alkylammonium stearate from Huntsman Int. LLC, Salt Lake City, UT, USA
[11]Nonionic thickening agent based on polyurethane from OMG Borchers GmbH, Langenfeld, DE Production of the Thermally Cured Foam
(Comparison)

Wetting agent and foam stabilizer were incorporated into the aqueous polyurethane dispersion 5), which is not radiation-curable, by means of shearing forces in accordance with Table 4. Foaming was then carried out by air being whipped in by means of a kitchen hand mixer. The foam had a final foam density of 500 g/l. Finally, the thickening agent was stirred in. The foam produced in this way had a homogeneous bubble distribution.

The foam was applied in a thickness of 1,000 μm to a release paper by means of a box knife and dried at room temperature for 60 minutes and then at 120° C. in an oven (without circulating air) for eight minutes. A temperature below 120° C. was not possible, since the foam still did not have an adequate mechanical stability at lower temperatures and became stuck under pressure.

TABLE 5

Data on the use testing of the foams

| | Example | | | | |
|---|---|---|---|---|---|
| | 1) | 2) | 3) | 4) | 5 (comparison) |
| Pressure sensitivity before UV curing[12] | 0% | 0% | 0% | 20% | 100% |
| Pressure sensitivity after UV curing[12] | 100% | 80% | 60% | 80% | — |
| Resistance to water before UV curing[13] | 100% | 80% | 20% | 40% | 100% |
| Resistance to water after UV curing[13] | 100% | 100% | 100% | 100% | — |
| Resistance to ethanol/water (50%) before UV curing[13] | 0% | 80% | 0% | 40% | 80% |
| Resistance to ethanol/water (50%) after UV curing[13] | 60% | 100% | 40% | 80% | — |

[12]For the determination, a ring (wall thickness 1 mm, diameter 5.7 cm) weighing 200 g was placed on the foam. The changes to be observed were evaluated according to the following scale of ratings: (A conclusion regarding the restoring force of the foams can be drawn from this parameter.) 100% rating: No changes 80% rating: Slight imprint which disappears again immediately 60% rating: Slight imprint easily detectable, disappears after a short time 40% rating: Clear imprint but no paper substrate visible (in the middle), slight recovery 20% rating: Clear imprint, paper substrate slightly visible, no recovery 0% rating: Sharp imprint to paper substrate, no recovery
[13]Using a pipette, in each case one drop of water or ethanol/water, 50% strength, was applied to the foam. The change in the surface was evaluated after 24 h at room temperature according to the following scale of ratings: 100% rating: No changes 80% rating: Slight depression visible, surface not destroyed 60% rating: Clear depression visible, surface not destroyed 40% rating: Clear depression visible, surface slightly destroyed 20% rating: Marked depression visible, surface destroyed 0% rating: Surface completely destroyed Table 2 shows that the polyurethane acrylate dispersions 1) to 4) gave very flexible radiation-cured films. Such a flexibility is necessary in order to obtain finally flexible radiation-cured foams such as are necessary for the textile sector.

Foams 1) to 4) according to the invention had a low restoring force (Table 5), i.e. they were very easy to emboss, after drying at 80° C. and before radiation curing. After the radiation curing the restoring force was increased significantly. An imprint could indeed be made on the radiation-cured foams, but after the loading they assumed their starting shape again. This shows that before the radiation curing embossing can be applied to the foams produced according to the invention, and this can then be fixed by radiation curing.

Comparison Example 5) already has a very high restoring force after thermal drying, i.e. mechanical embossing is no longer possible.

The sensitivity to water or ethanol/water, 50% strength, was reduced decisively by the radiation curing. Foam 2) was even found to be completely insensitive to ethanol/water 50% strength and would be capable of withstanding alcohol domestic cleaning compositions. The examples show that crosslinking by means of radiation curing proceeded successfully in the foams produced according to the invention. At the same time, this is a remarkable result, since it was to be expected that because of the very large surface area of the foams, a marked inhibition of the free radical polymerization by oxygen takes place, and that because of the layer thickness of 1,000 µm, crosslinking in the depth of the foam decreases severely, which, however, was not the case. Compared with the foam from Example 5), which was dried at 120° C., the foams according to the invention achieved comparably good resistances after radiation curing, but had to be dried only at 80° C. The foams according to the invention are therefore suitable for application to heat-sensitive textiles, such as, for example, Elastan®, in the direct brushing process.

The invention claimed is:

1. A process for producing radiation-cured foams comprising
   1) foaming an aqueous composition A) comprising
      A1) one or more radiation-curable aqueous binders comprising polyurethane (meth)acrylates (i);
      A2) one or more thickeners; and
      A3) one or more foam stabilizers,
         wherein the foaming is carried out by introducing a blowing agent selected from the group consisting of air and inert gas, in an amount sufficient to obtain a foam density of from 200 to 1,000 g/L;
   2) thermal drying of the foam produced from step 1);
   2a) embossing the foam produced from step 2); and
   3) curing of the foam by actinic radiation;
      wherein 2) and 3) are optionally repeated one or more times, and
   wherein the foam produced by 1) foaming of the aqueous composition A) has a foam density of from 200 to 1,000 g/L prior to 2) thermal drying of the foam produced from 1) and has a foam density of from 50 to 600 g/L after 2) thermal drying of the foam produced from 1).

2. The process of claim 1, wherein the polyurethane (meth)acrylates (i) are prepared from at least
   A1.1) one or more compounds with at least one group which is reactive towards isocyanate and at least one unsaturated group which can undergo free radical polymerization;
   A1.2) one or more monomeric and/or polymeric compounds which differ from A1.1);
   A1.3) one or more compounds with at least one group which is reactive towards isocyanate and additionally at least one group having a hydrophilizing action; and
   A1.4) one or more organic polyisocyanates.

3. The process of claim 2, wherein a component A1.5) which differs from A1.1) to A1.3) and has at least one amine function is present in the composition from which said polyurethane (meth)acrylates (i) are prepared.

4. The process of claim 2, wherein component A1) comprises polyurethane (meth)acrylates (i) and component (ii), a reactive diluent with at least one group which can undergo free radical polymerization.

5. The process of claim 1, wherein the content of radiation-curable unsaturated groups of component A1) is between 0.3 and 6.0 mol/kg, based on the sum of the parts by weight of the non-aqueous constituents of component A1).

6. The process of claim 1, wherein 2) thermal drying of the foam produced from 1) is carried out at 25 to 150° C.

7. A radiation-cured foam produced by the process of claim 1.

8. A substrate coated with the radiation-cured foam of claim 7.

* * * * *